United States Patent [19]

Smith

[11] 4,367,989
[45] Jan. 11, 1983

[54] PORTABLE GOLD COLLECTION APPARATUS

[76] Inventor: Terry G. Smith, 124 McKiernan Dr., Folsom, Calif. 95630

[21] Appl. No.: 209,051

[22] Filed: Nov. 21, 1980

[51] Int. Cl.³ .............................................. B65G 53/14
[52] U.S. Cl. ......................................... 406/153; 37/61
[58] Field of Search ................. 406/153, 38, 168, 175; 37/61, 62, 63

[56] References Cited

U.S. PATENT DOCUMENTS

| | | | |
|---|---|---|---|
| 105,056 | 7/1870 | Eads | 406/153 X |
| 743,979 | 11/1903 | Flood | 406/153 X |
| 795,412 | 7/1905 | Olson | 406/168 |
| 842,383 | 1/1907 | Clark | 406/153 X |
| 910,277 | 1/1909 | Eliel | 406/168 X |
| 1,047,164 | 12/1912 | Butenschoen | 406/38 |
| 1,444,069 | 2/1923 | Gyger | 406/156 X |
| 1,854,383 | 4/1932 | Rotinoff | 37/61 |
| 2,044,088 | 6/1936 | Lurd | 406/153 X |
| 2,073,122 | 3/1937 | Silke | 406/38 X |
| 2,262,943 | 11/1941 | Kalbaugh | 37/61 |
| 2,718,717 | 9/1955 | Collins | 37/61 |
| 3,186,769 | 6/1965 | Howlett | 406/153 |
| 3,306,672 | 2/1967 | Kleiner et al. | 406/153 |
| 3,448,691 | 6/1969 | Frazier | 103/271 |
| 3,457,863 | 7/1969 | Carter | 103/5 |
| 3,474,549 | 10/1969 | Schnell | 37/61 |
| 3,535,801 | 10/1970 | Richter | 37/61 |

*Primary Examiner*—John J. Love
*Assistant Examiner*—Gene A. Church
*Attorney, Agent, or Firm*—Blair, Brown & Kreten

[57] ABSTRACT

A portable device for collecting particulate gold bearing material from rock crevices and the like which include a gas engine driven air blower having shoulder straps for mounting on the back of a user, the air blower being connected by a flexible duct to an elongated flexible conduit having a nozzle or crevice tool connected to the conduit front end, a container having an air outlet connected to the rear end of the conduit and adapted to be dragged along on the ground, the duct having an outlet end connected to the conduit in communication with the conduit central passage so that the air blown into the conduit from the blower provides a jet pump action to suck particulate material into the nozzle, through the conduit central passage and into the container for collection with air being discharged through the container air outlet together with a deflector within the conduit central passage for radially deflecting the stream of particulate material flowing within the conduit central passage.

11 Claims, 3 Drawing Figures

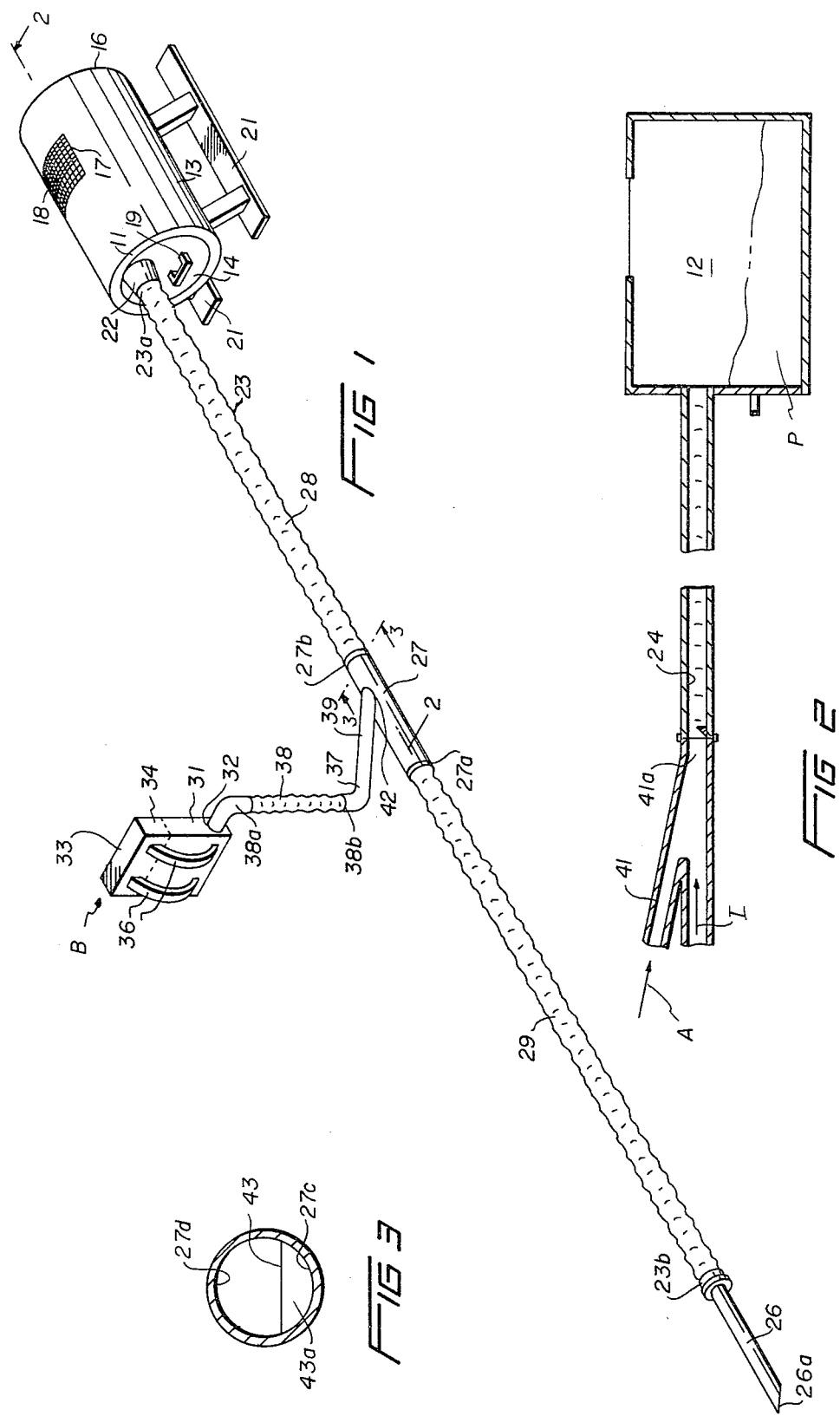

PORTABLE GOLD COLLECTION APPARATUS

BACKGROUND OF THE INVENTION

The rapid increase in the market value of precious metals such as gold has inspired a renewed interest on the part of the public in prospecting for gold throughout well known gold mining areas. As a result of this renewed interest, an increasing number of individuals are combing traditional gold bearing terrain such as dried up stream beds, mountainous areas, rocky terrain and the like using hand tools such as picks, pans, shovels, etc. The expected and proven theory is that particles of gold can be found mixed with granular material such as sand, gravel so that such gold bearing sand and gravel is collected by individuals for subsequent recovery of the gold particles therefrom.

With the use of such simple tools, it is obvious that the collection of gold bearing particulate material is a laborious and time consuming operation. The recovery and collection of such gold bearing particulate material becomes even more prolonged and difficult where such particulate material is removed from rock crevices a favorite location for the recovery of such material. Not only must such material be loosened from such relatively narrow crevices but the difficulty of collecting such removed material is a vexing and frustrating experience.

OBJECTS AND SUMMARY OF THE INVENTION

Accordingly, a primary object of this invention is to provide a new and novel apparatus for collecting gold bearing particulate material such as sand or gravel in a simple and easy manner.

Another object of this invention is to provide a new and novel apparatus for collecting gold bearing particulate material which permits such particulate material to be removed from difficult locations such as rock crevices in a rapid manner and at a high rate.

A further object of this invention is to provide a new and novel apparatus for collecting gold bearing particulate material which requires a minimum of effort on the part of the user and which permits the user to move from location to location accummulating such particulate material during the collection at each location.

Still another object of this invention is to provide a new and novel apparatus for collecting gold bearing particulate material which is completely self contained, is relatively inexpensive and which does not require the use of water.

The objects of the invention and other related objects are accomplished by the provision of a container for particulate material having an inlet to which one end of a conduit having a central bore is attached, at least a portion of the conduit being of flexible material. Air blowing means having an outlet is adapted to be supported on the body of a user the outlet of the air blowing means being connected to one end of a duct with the duct other end in communication with the conduit central bore for directing air from the air blowing means into the conduit central bore towards the conduit one end to provide a jet pump action. At least a portion of the duct is of flexible material and a nozzle having an inlet is provided on the other end of the conduit for sucking particulate material into the conduit central bore under the jet pump action of the air blowing means so that a stream of particulate material flows within the central bore into the container inlet with the particulate material being collected within the container from which air is discharged through a suitable screened opening in the container wall.

Other objects and advantages will become apparent in the following specification when considered in light of the attached drawings.

BRIEF DESCRIPTION OF THE DRAWINGS

FIG. 1 is a perspective view of the apparatus for collecting gold bearing particulate material constructed in accordance with the invention;

FIG. 2 is an enlarged sectional view taken substantially along lines 2—2 of FIG. 1 in the direction of the arrows; and FIG. 3 is an enlarged sectional view taken substantially along lines 3—3 of FIG. 1 in the direction of the arrows.

DESCRIPTION OF THE PREFERRED EMBODIMENT

Referring now to the drawing and to FIG. 1 in particular, there is shown a portable gold collection apparatus constructed in accordance with the invention and designated generally by the letter C. The collection apparatus C includes a container 11 having an interior 12 for the collection of particulate material such as sand, gravel or the like which includes particles of gold and which is designated in FIG. 2 by the letter P.

The container 11 is preferably of circular cross-sectional shape having a side wall 13 and a pair of end walls 14, 16. The container side wall 13 is provided with an opening 17 having a screen 18 mounted therein for the passage of air. Also, the container 13 is preferably provided with a strap 19 which may be grasped by the hand of a user for moving the container 11 from location to location. Also, the outer surface of the container side wall 13 is preferably provided with a plurality of legs 21 for sliding engagement with a supporting surface such as the ground.

The container 11 is also provided with an inlet 22 to which is connected one end 23a of a conduit 23 having a central bore 24. A nozzle or crevice tool 26 having an inlet end 26a is connected to the other end 23b of the conduit 23 so that particulate material entering the nozzle inlet 26a travels in the direction of the arrow I of FIG. 2 along the conduit central bore 24 and is discharged into the container interior 12.

At least a portion of the conduit 23 is formed of flexible material and in the illustrated embodiment the conduit 23 includes a centrally disposed, rigid tubular section 27 of metal or the like having collars 27a, 27b at opposite ends. The conduit 23 also includes a first tubular section 28 of flexible material which may be in the form of a flexible hose or the like having one end connected to the container inlet 22. The other end of the first tubular section 28 is connected to the end of the rigid tubular section 27 by means of a hose clamp H.

A second tubular section 29 is connected at one end to the other end of the rigid tubular section 27 by means of a hose clamp H and the other end of the second tubular section is connected to the nozzle 26 by means of a hose clamp.

The collection apparatus C of the invention also includes air blowing means designated generally by the letter B which are adapted to be mounted on the body of a user. More specifically, the air blowing means includes an air blower 31 of conventional construction such as a leaf blower or the like having an outlet 32 the blower 31 being arranged to be driven by suitable means such as a gasoline engine 33 or the like. Preferably, the blower 31 and engine 33 are disposed within a suitable bracket 34 which is provided with a pair of straps 36 so that it may be worn on the body of a user.

The blower 31 is connected in communication with the central bore 24 of the conduit 23 to provide a jet pump action so as to provide a suction at the inlet end 26a of the nozzle 26 so as to convey the sucked-in particulate material to the container 11. More specifically, a duct 37 at least a portion of which is of flexible material is connected at one end to the blower outlet 32 and is preferably of substantially U-shaped configuration as shown in FIG. 1. The duct 37 includes a tubular section 38 of flexible material having one end 38a connected to the blower outlet 32 and a rigid tubular section 30 having one end connected to the other end 38b of the flexible section 38. The other end portion 41 of the rigid section 39 of the duct 37 is obliquely connected to the rigid section 27 as shown in FIG. 2 with its outlet end 41a disposed within the conduit central bore 24 and directed towards the conduit end 23a adjacent the container 11. Preferably the portion 41 of the duct section 39 is formed integrally with the conduit section 27 as shown.

Thus, when the blower 31 is driven by the engine 33 air is blown through the duct 37 as indicated by the arrow A and flows out of the duct opening 41a into the conduit central bore 24 producing the well known jet pump action so that air and particulate material are sucked into the nozzle inlet opening 26a and a stream of particulate material flows from the nozzle 26 into the container interior 12.

In the preferred embodiment, deflector means are provided in the conduit central bore 24 downstream of the duct outlet 41a for radially deflecting the stream of particulate material flowing in the central bore 24 to thereby reduce the cross-sectional area of the stream and increase the velocity of the stream of particulate material. In the illustrated embodiment, the deflector means include a segmental plate 43 mounted on the lower portion 27c of the rigid tubular section 27 of the conduit 23 within the central bore 24. The segmental plate 43 is provided with a side face 43a which is inclined towards the conduit end 23a so that the stream of particulate material flowing in the direction of the arrow I within the central bore of conduit 23 is deflected radially upward concentrating the stream of particulate material with an attendant reduction in the stream cross-sectional area.

Having thus described the preferred embodiment of the invention it should be understood that numerous structural modifications and adaptations may be resorted to without departing from the spirit of the invention.

What is claimed is:

1. An apparatus for collecting particulate material including gold or the like comprising, in combination:
   a container for said particulate material having an inlet,
   a conduit having a central bore connected at one end to said container inlet,
   air blowing means having an outlet and adapted to be supported on the body of a user,
   a duct connected at one end in communication with said outlet of said air blowing means, the other end of said duct connected in communication with said conduit central bore for directing air blowing means into said conduit central bore towards said conduit one end to provide a jet pump action,
   and a nozzle having an inlet on the other end of said conduit for sucking said particulate material into said conduit central bore by said jet pump action including deflector means in said conduit central bore downstream of said duct other end for radially deflecting the stream of particulate material flowing in said central bore to thereby reduce the cross-sectional area of said stream and increase the velocity of said stream flowing towards said container wherein said deflector means comprises a segmental plate mounted on the lower portion of the inner wall of said conduit within said central bore,
   said segmental plate having a side face inclined towards said conduit one end for directing said stream of particulate material towards the upper portion of said conduit inner wall,
   said segmental plate having a top edge defining a chord of a circle.

2. An apparatus in accordance with claim 1 wherein at least a portion of said duct is of flexible material to permit said duct to be manipulated relative to said air blowing means.

3. An apparatus in accordance with claim 2 wherein at least a portion of said conduit is of flexible material to permit said nozzle to be manipulated relative to said conduit.

4. An apparatus in accordance with claim 3 including deflector means in said conduit central bore downstream of said duct other end for radially deflecting the stream of particulate material flowing in said central bore to thereby reduce the cross-sectional area of said stream and increase the velocity of said stream flowing towards said container.

5. An apparatus in accordance with claim 4 wherein said deflector means comprises a segmental plate mounted on the lower portion of the inner wall of said conduit within said central bore, said segmental plate having a side face inclined towards said conduit one end for directing said stream of particulate material towards the upper portion of said conduit inner wall.

6. An apparatus in accordance with claim 3 wherein said container comprises a hollow body including a side wall and a pair of end walls defining an interior for collecting said particulate material and wherein said side wall is provided with an opening and including a screen in said opening for discharging air in said stream of particulate material from said container interior.

7. An apparatus in accordance with claim 6 wherein said air blowing means comprises a housing, a blower in said housing and self-contained drive means for rotating said blower and including strap means on said housing for supporting said housing on the body of the user.

8. An apparatus in accordance with claim 7 wherein said container is of circular cross-sectional shape and including a plurality of legs on the outer surface of said container side wall for dragging engagement with a supporting surface such as the ground.

9. An apparatus in accordance with claim 8 wherein said duct includes a tubular section of flexible material connected at one end to said blower outlet, a rigid U-shaped tubular section having one end connected to the other end of said flexible tubular section, the other end of said U-shaped tubular section being connected in communication with said conduit central bore and having an outlet end directed towards said conduit one end.

10. An apparatus in accordance with claim 9 wherein said conduit includes a centrally disposed, rigid tubular section and wherein said other end of said duct U-shaped tubular section is connected obliquely with said rigid tubular section, a first tubular section of flexible material connected at one end to said container inlet and connected at the other end to one end of said rigid tubular section, a second tubular section of flexible material connected at one end to the other end of said rigid tubular section and wherein said nozzle is connected to the other end of said second tubular section.

11. The apparatus in accordance with claim 10 wherein said container includes a carrying strap on said end wall.

* * * * *